United States Patent [19]
Bridges

[11] Patent Number: 5,286,064
[45] Date of Patent: Feb. 15, 1994

[54] SEALING PLATE FOR A PIPE COUPLING

[76] Inventor: Donald Y. Bridges, 3014 Creek Ct., Roswell, Ga. 30075

[21] Appl. No.: 861,940

[22] Filed: Apr. 2, 1992

[51] Int. Cl.$^5$ .............................................. F16L 55/18
[52] U.S. Cl. ..................... 285/15; 285/373; 285/910; 285/915; 138/97; 29/402.09; 29/402.14; 277/169
[58] Field of Search ............. 285/373, 910, 15, 419, 285/915; 138/97, 99; 29/402.09, 402.14, 402.15, 402.17; 277/9, 169, 208, 207 A

[56] References Cited

U.S. PATENT DOCUMENTS

| | | | |
|---|---|---|---|
| 1,059,592 | 4/1913 | Byers . | |
| 1,607,943 | 11/1926 | Carson et al. . | |
| 1,790,957 | 2/1931 | Sykes | 285/918 X |
| 2,245,153 | 6/1941 | McWane | 277/169 |
| 2,849,244 | 8/1958 | Sampson | 285/918 X |
| 2,913,262 | 11/1959 | De Cenzo et al. . | |
| 3,153,550 | 10/1964 | Hollett . | |
| 3,479,066 | 11/1969 | Gittleman | 285/373 X |
| 3,712,631 | 1/1973 | Forchini et al. | 285/918 X |
| 3,823,216 | 7/1974 | Petzetakis | 285/915 |
| 4,108,481 | 8/1978 | Graham | 285/379 X |
| 4,172,607 | 10/1979 | Norton | 285/373 X |
| 4,303,103 | 12/1981 | Marks et al. | 29/402.09 X |
| 4,360,227 | 11/1982 | Bridges . | |
| 4,583,770 | 4/1986 | Kreku et al. . | |
| 4,652,023 | 3/1987 | Timmons | 285/373 X |
| 4,653,782 | 3/1987 | Munday . | |
| 4,664,428 | 5/1987 | Bridges . | |
| 4,944,498 | 7/1990 | Körtgen et al. | 277/208 |
| 5,076,618 | 12/1991 | Bridge . | |
| 5,086,809 | 2/1992 | Bridges . | |

FOREIGN PATENT DOCUMENTS

| | | | |
|---|---|---|---|
| 0227512 | 1/1959 | Australia | 285/373 |
| 3017632 | 12/1981 | Fed. Rep. of Germany . | |
| 0763665 | 12/1956 | United Kingdom | 285/373 |
| 0790109 | 2/1958 | United Kingdom | 285/373 |

Primary Examiner—Randolph A. Reese
Assistant Examiner—Heather Chun
Attorney, Agent, or Firm—Jones & Askew

[57] ABSTRACT

A sealing plate which is positioned under annular O-rings or built-in coupling gaskets. The sealing plate carries gasket material on its inner surface to complete an annular seal around the pipeline on either side of a leak location, and on its outer surface to prevent fluid from reaching the axial joint of the coupling between the annular seal. Once one positions the sealing plate properly, the annular gasket material does not become misaligned. Furthermore, the sealing plate can be used interchangeably with discrete O-rings and a coupling, or with a coupling having built-in arcuate gasket sections.

21 Claims, 4 Drawing Sheets

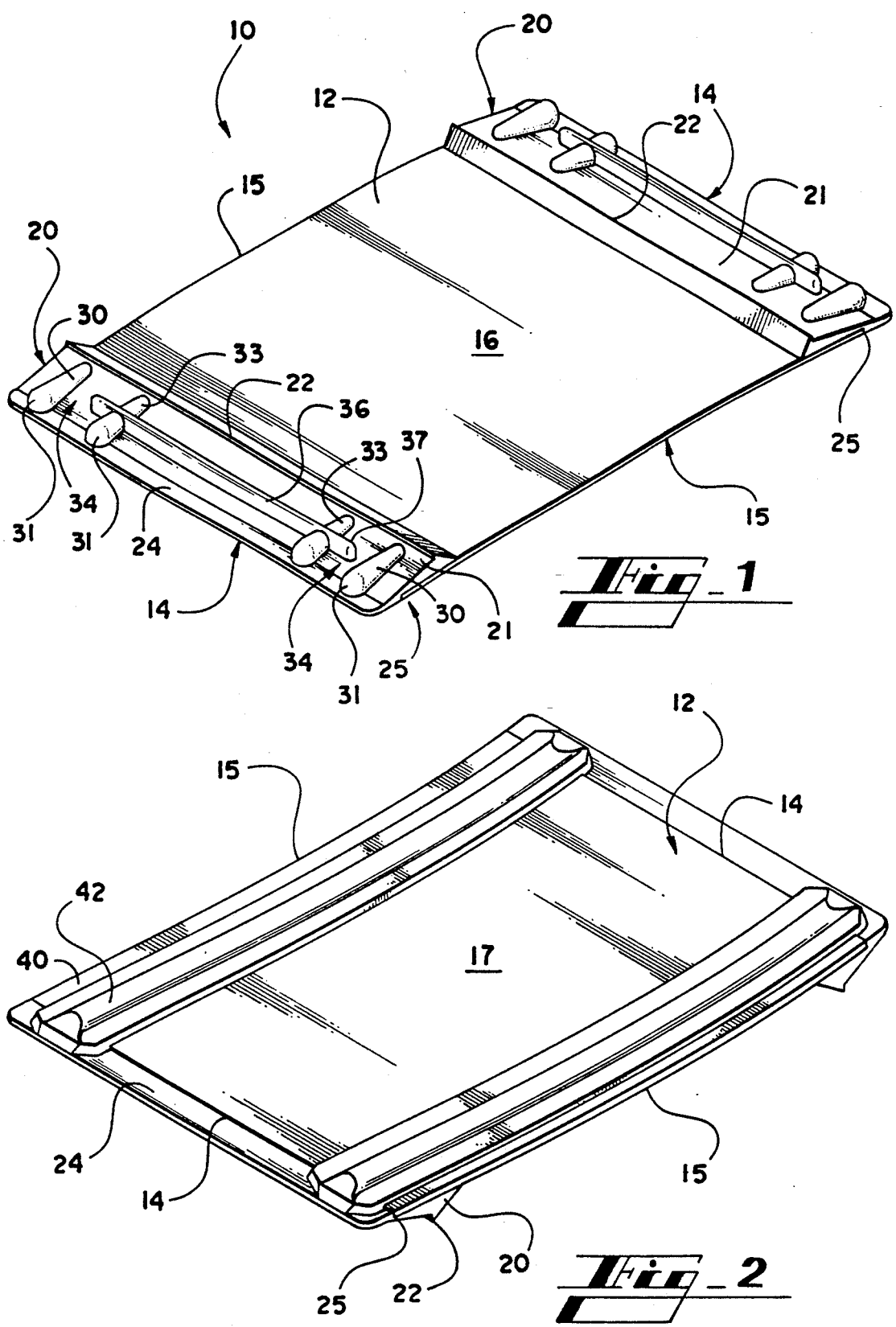

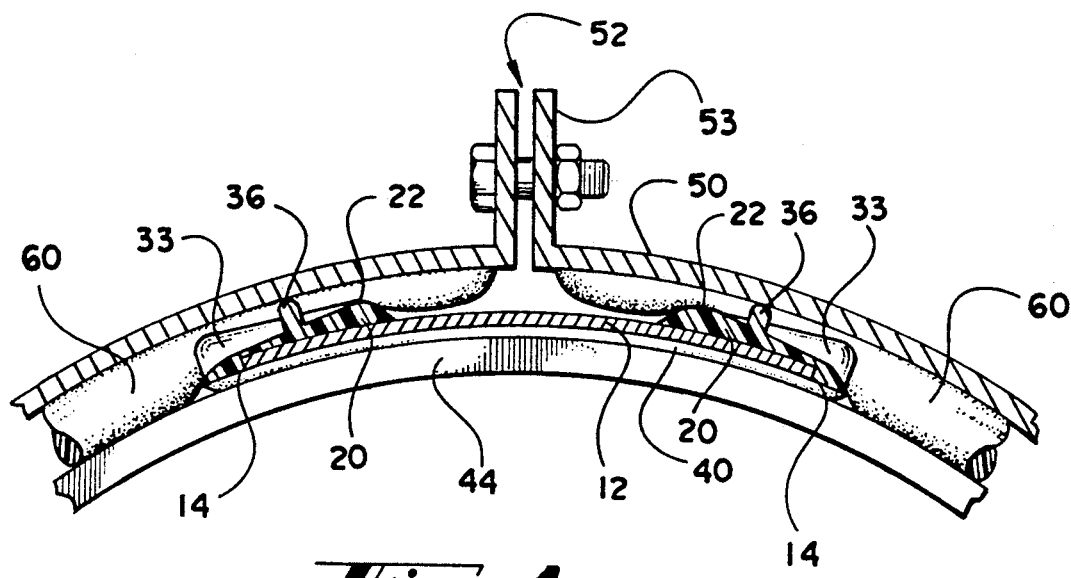
_Fig_4
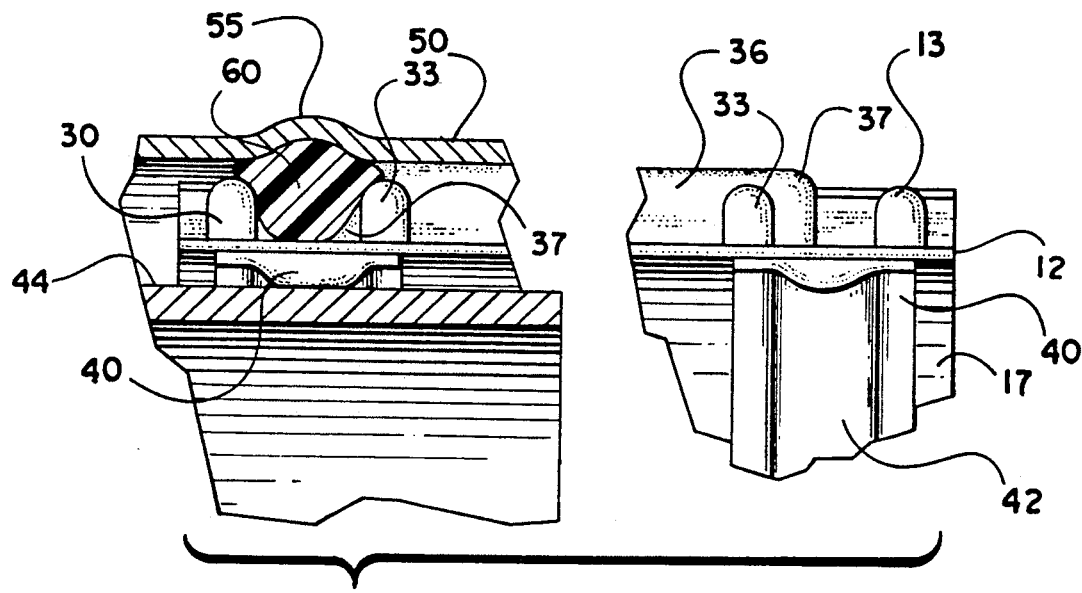
_Fig_5
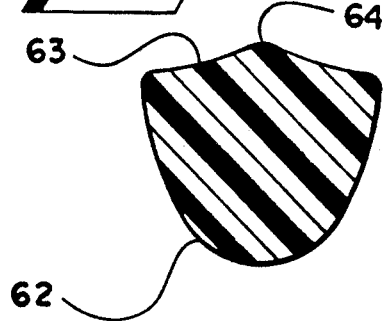
_Fig_7

SEALING PLATE FOR A PIPE COUPLING

TECHNICAL FIELD

The present invention relates to couplings for sealing leak locations in pipe lines, including joints between adjacent pipe ends, and particularly relates to a sealing plate for use in sealing the axial joint of a pipe coupling.

BACKGROUND ART

Sealing joints and other leak locations in pipelines has always been a critical concern, and has become more important as efforts have increased to protect the environment. Liquid chemicals, sewage, toxic gases, and other fluid-like materials such as fine dust must be conducted through pipelines without leakage of the material from the pipeline and without contamination from outside. To seal joints, pipeline installers typically encircle the joint with a cylindrical coupling consisting of either two semi-cylindrical pieces fastened together to clamp down on the pipe ends, or a single cylindrical piece having an axial slit which allows the coupling to be opened by an amount sufficient to fit over the pipe ends.

Annular gasket members, such as O-rings, may be placed around the pipe ends beneath the coupling to block the escape of fluid axially between the coupling and the pipe ends, but it is then necessary to block escape of fluid outwardly through the axial slit of the coupling. Several prior devices for this purpose have been developed, as described in U.S. Pat. Nos. 4,360,227; 1,607,943; 2,913,262; 3,153,550; 4,664,428, and 5,086,809.

U.S. Pat. No. 4,664,428, which is incorporated herein by reference in its entirety, describes a sealing plate spanning the axial slit of a coupling and contacting two O-rings positioned on opposite sides of the joint in the pipeline. The sealing plate is positioned outside the O-rings between them and the coupling and has axial gaskets along edges of the sealing plate for preventing passage of fluid from between the O-rings to the outer surface of the sealing plate. This sealing plate has the disadvantage, however, that it can only be used with continuous annular O-rings which must be properly positioned on the pipe ends before positioning the sealing plate over the O-rings and then positioning the coupling over the sealing plate and O-rings. Couplings having arcuate gasket members attached to the inside of the coupling cannot be used with such a sealing plate. During the positioning and tightening of the coupling, the O-rings may become misaligned or the sealing plate may become misaligned with respect to the O-rings. These problems in installation can be particularly difficult when couplings are being placed under water by divers, in confined areas, in open trenches or channels containing flowing water, or on existing pipelines to repair a joint or leak.

Thus, there is a need in the art for a sealing plate that can be installed reliably and conveniently in awkward situations, and that can be used with couplings which have O-ring sections attached to the interior of the couplings.

SUMMARY OF THE INVENTION

The present invention solves the above problems in the art by providing a sealing plate which is positioned under annular O-rings or built-in coupling gaskets. The sealing plate carries gasket material on its inner surface to complete an annular seal around the pipeline on either side of a leak location, and on its outer surface to prevent fluid from reaching the axial joint of the coupling between the annular seal. An advantage of the sealing plate of the invention is that once one positions the sealing plate properly, the annular gasket material does not become misaligned. Furthermore, the sealing plate can be used interchangeably with discrete O-rings and a coupling, or with a coupling having built-in arcuate gasket sections.

Generally described, the present invention provides a sealing plate for use with a pipe coupling surrounding a leak location in a pipeline, comprising a plate having a pair of axial edges along opposite ends of the plate and a pair of side edges along opposite sides of the plate; a pair of axial sealing pads, one adhered to an outer surface of the plate along each of the axial edges, each axial sealing pad defining a pair of spaced apart circumferential guide channels therein and a bridging member connecting the guide channels, the bridging member shaped to be engaged when an inner surface of a coupling is pressed toward the outer surface of the plate; and a pair of spaced apart circumferential sealing pads adhered to an inner surface of the plate.

Preferably, the axial sealing pad extends beyond each of the axial edges at the location of the guide channels and the circumferential sealing pads extend beyond the axial edges and are attached to the axial sealing pads at opposite ends of the circumferential sealing pads. Also in the preferred embodiment, each of the guide channels is defined by a pair of spaced apart humps positioned adjacent to a side edge of the plate, and the bridging member connecting the guide channels comprises an axial ridge connecting the inner humps of the two pair of humps defining the two guide channels of each of the axial sealing pads. The axial ridge may extend beyond the inner humps into the guide channels to form a more positive seal between the bridging member and arcuate gasket members received in the guide channels.

In a pipe joint, and in a method of sealing same, the sealing plate cooperates with a pair of arcuate gaskets positioned around the pipeline one on each side of the leak location, each of the arcuate gaskets engaging both of the axial sealing pads in respective guide channels; and an annular coupling having at least one axial joint, the coupling being positioned around the arcuate gaskets with its axial joint positioned over the sealing plate, the coupling being closable to engage an inner surface of the coupling with the gaskets and with the bridging members, and to engage the circumferential sealing pads with the pipeline on either side of the leak location. The arcuate gaskets may be attached to the inner surface of the coupling, or may be annular O-rings positioned around the sealing plate. Annular O-rings in such a configuration help to retain the sealing plate in position while the coupling is closed, and the guide channels of the sealing plate in turn help to retain the O-rings in proper position.

The present invention also provides an elongate gasket member comprising a rounded side and a flattened side intersecting along a pair of mutual edges, the flattened side including a ridge intermediate the edges. Such a gasket member may be built into a coupling by adhering the gasket member within grooves defined in the inner surface of the coupling.

Thus, it is an object of the present invention to provide an improved seal for a pipe coupling.

It is a further object of the present invention to provide an improved method for sealing a leak location in a pipeline.

It is a further object of the present invention to provide a sealing plate for a pipe coupling which is easy to position on a pipeline under water, in confined areas, in open trenches or channels containing flowing water, or on existing pipelines to repair a joint or leak.

It is a further object of the present invention to provide a sealing plate for a pipe coupling used with O-rings, which assists in preventing the O-rings from becoming misaligned during installation of the coupling.

It is a further object of the present invention to provide a sealing plate which can be used interchangeably with discrete O-rings and a coupling, or with a coupling having built-in arcuate gasket sections.

It is a further object of the present invention to provide an improved shape for an elongate gasket material.

It is a further object of the present invention to provide an improved method for sealing a leak location in a pipeline.

Other objects, features, and advantages of the present invention will become apparent upon review of the following detailed description of embodiments of the invention, when taken in conjunction with the accompanying drawing and the appended claims.

BRIEF DESCRIPTION OF THE DRAWING

FIG. 1 is a top pictorial view of a sealing plate embodying the present invention.

FIG. 2 is a bottom pictorial view of the sealing plate of FIG. 1.

FIG. 4 is a radial cross-sectional view taken along line 4—4 of FIG. 3.

FIG. 5 is an end view of the sealing plate of FIG. 1, showing one side as installed on a pipe end under a coupling.

FIG. 7 is a cross-sectional view of an elongate gasket material used in a pipe joint embodying the invention.

DETAILED DESCRIPTION

Figure 3:
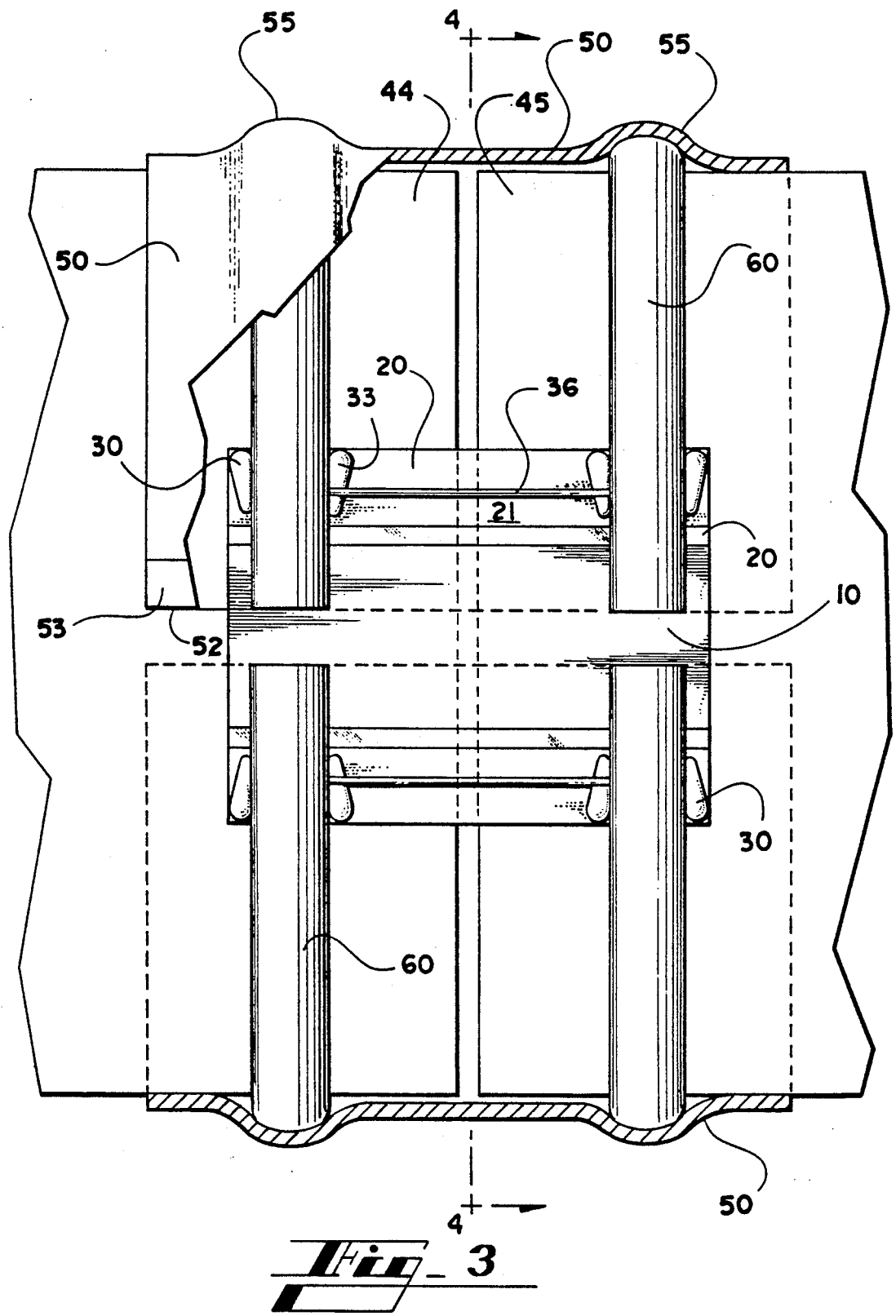
FIG. 3 is a top plan view of a pipe joint with a sealing plate embodying the invention installed therein, with portions of the coupling broken away.
Figure 6:
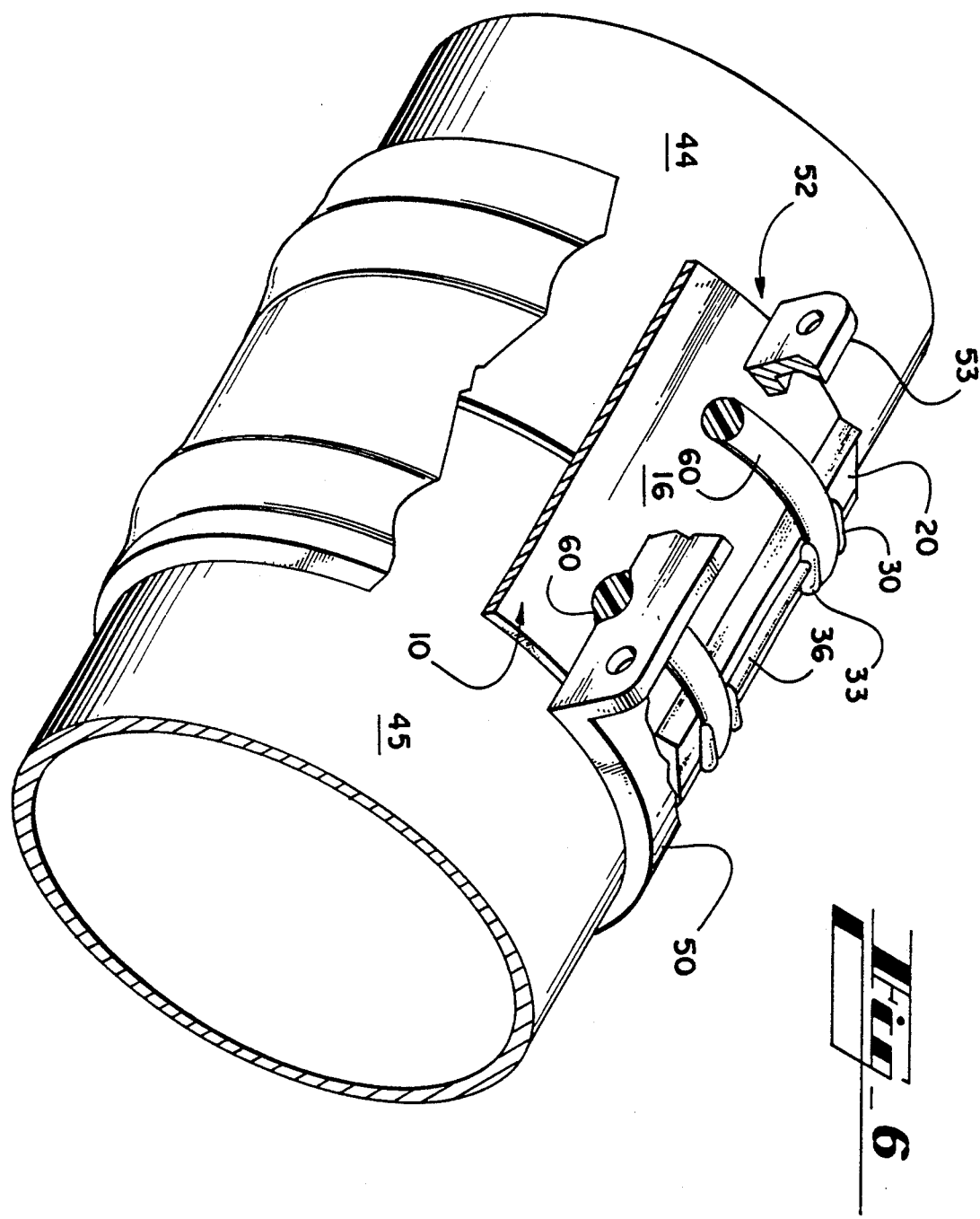
FIG. 6 is a pictorial view of the sealing plate installed in a pipe joint, with portions of the coupling broken away.

Referring now in more detail to the drawings, in which like numerals refer to like parts throughout the several views, FIG. 1 shows a sealing plate 10 embodying the present invention. The sealing plate 10 includes a central plate member 12, preferably made of steel. The rectangular plate member 12 is curved to match the circumference of the pipe line with which it will be used, and defines a pair of opposing axial edges 14 connected by a pair of opposing circumferential edges 15. The plate member 12 has an outer surface 16 which faces away from the center of the pipeline when installed, and an inner surface 17, visible in FIG. 2.

Two axial sealing pads 20 are attached to the outer surface 16 of the plate 12, one along each of the axial edges 14. Each of the axial sealing pads 20 is triangular in cross section. A broad, elongate face 21 of the triangular pad faces the axial edge 14, and an apex ridge 22 is formed at the apex of the triangle. The axial sealing pad 20 extends beyond the axial edge 14 of the plate 12 to form a skirt 24. The skirt extends down over the axial edge 14 at a shoulder 25 formed in the material of the axial sealing pad 20. Those skilled in the art will understand after reviewing the installation of the sealing plate that the material of the skirt 24 between the inner humps 33 is not required for the sealing function of the sealing plate 10.

Each axial sealing pad 20 also defines a plurality of approximately cone shaped humps which extend circumferentially from a point adjacent to the apex ridge 22 down the broad face 21 and onto the skirt 24, with the base 31 of each cone positioned adjacent to the edge of the skirt 24. Two outer humps 30, shaped as just described, are positioned a short distance inwardly from the circumferential edges 15. Two inner humps 33 are positioned on the axial sealing pads 20 a short distance inwardly from each of the outer humps 30. The pairs of adjacent humps 30, 33 form between them two guide channels 34 for receiving O-rings, as described below.

A thick axial ridge 36 extends between and connects the inner humps 33. The axial ridge 36 must be sufficiently high that a coupling installed over the sealing plate will engage the axial ridge 36 along its entire length, in the manner shown in FIGS. 4 and 5. Preferably the axial ridge 36 has a pair of extensions 37, one extending on each end of the axial ridge 36 past the inner humps 33 into the guide channels 34. The purpose of the extensions 37 is to provide a better sealing engagement with O-rings positioned in the guide channels 34.

A pair of spaced apart circumferential sealing pads 40 are attached to the inner surface 17 of the plate members 12. The two circumferential sealing pads 40 are positioned so as to extend past the axial edges 14 of the plate 12 for attachment to the inner surface of the skirt 24 at the location of the guide channels 34. In axial cross section, the circumferential sealing pads 40 are formed by strips of gasket material molded or extruded with an approximately half-circular central protrusion 42 at the center of the pad 40. The central protrusion 42 extends along the length of the pad 40.

The axial and circumferential sealing pads, as well as O-rings and arcuate gaskets described herein, are preferably made of rubber having a hardness of 40 to 70 Durometer. The axial sealing pads are adhered to the metal plate 12 preferably by a well known chemical vulcanization process. The axial and circumferential sealing pads are adhered to one another preferably by conventional vulcanization process, which may be a heat/pressure vulcanization process.

Use of the sealing plate 10 to seal a joint between adjacent pipe ends 44 and 45 is shown in FIGS. 3-6. The sealing plate is positioned directly on the pipe line with the circumferential sealing pads 40 extending parallel and on opposite sides of the gap between the pipe ends. The axial sealing pads 20 extend along the pipe line and perpendicular to the gap. In contrast to prior sealing plates for this type of application, the sealing plate 10 according to the present invention is positioned under the arcuate gaskets which surround the pipe ends. This allows the sealing plate to be used both with separate circular O-rings and with arcuate gasket segments built into the inner surface of a coupling.

FIGS. 3-6 show a coupling 50 which has at least one axial slit 52 and includes a pair of upstanding clamping flanges 53 which can be bolted together to close the axial slit and thus press the coupling 50 against the outer circumferential surface of the pipe line and the sealing plate. In the case of the preferred coupling 50 shown, a pair of annular recesses 55 are formed in the inner surface of the coupling, spaced apart by the same distance as the guide channels 34 of the sealing plate 10. An arcuate gasket section 60 is vulcanized into each of these annular recesses, and extends to both sides of the axial slit 52 of the coupling. Those skilled in the art will understand that the arcuate gasket segments 60 need only extend to a position between the sealing pads 20 and the flanges 53. It will often be convenient to form the coupling 50 as a pair of semi-circular coupling segments (not shown) so that there are two axial slits requiring two sealing plates 10 to form the pipe joint. Both such joints may be identical to the joint shown in FIGS. 3–6.

After the sealing plate is placed across the gap between the pipe ends 44 and 45, the coupling 50 is placed over the pipe ends with an axial slit 52 positioned over the central area of the plate 12 and with arcuate gasket members 60 crossing the axial sealing pads 20 in the guide channels 34. This is shown in FIG. 3 from directly above the sealing plate 10, with the outline of the coupling shown in dashed lines. As the coupling 50 is tightened down against the sealing plate, the arcuate gasket material is compressed into the guide channels 34 and comes into engagement with the humps 30 and 33. In the preferred embodiment, the arcuate gaskets 60 also engage and compress the extensions 37 of the axial ridges 36, as best shown in FIG. 5. When fully tightened, the coupling 50 between the arcuate gaskets 60 comes into engagement with the axial ridges 36, as shown in FIGS. 4 and 5. At the point where the arcuate gaskets 60 pass over the axial edges 14 of the sealing plate 10, the arcuate gaskets 60 are pressed against the skirt 24, thereby sealingly connecting them to the circumferential sealing pads 40 lying underneath the sealing plate 10, as shown in FIG. 4.

Thus, all possible paths of fluid from inside the pipe line through the axial slit of the coupling are sealed off. Any fluid attempting to pass axially between the coupling and the pipe ends is blocked by the annular gasket material 60. Any fluid attempting to pass axially between the sealing plate and the pipe ends is blocked by the circumferential sealing pads 40. Any fluid attempting to pass circumferentially between the coupling and the upper surface of the sealing plate is blocked by the axial ridges 36 and the arcuate gaskets 60 as they pass through the guide channels 34.

If separate, circular O-rings (not shown) are used, they are placed around the pipe ends and the sealing plate 10, passing through the guide channels 34 and passing over the central portion of the outer surface 16 of the plate 12. In this case, the gaskets 60 as shown in FIG. 3 would be connected over the center of the sealing plate, but the sealing of the joint is the same as in the embodiment shown in FIG. 3. It will be seen that in this configuration the sealing plate 10 and the O-rings mutually cooperate to hold each other in position while the coupling is placed in position. Thus, there is less tendency of the O-rings and the sealing plate to become misaligned during the positioning and tightening of the coupling.

FIG. 7 shows a preferred cross section for the gasket material used to form the arcuate gasket 60. The gasket 60 defines a rounded side 62 extending about 240 degrees around the circumference of the gasket material, with the remaining portion 63 being generally flattened. A slight ridge 64 extends outwardly along the center of the flattened portion. The preferred shape as shown in FIG. 7 resembles a medallion or shield. When used as a circular O-ring in connection with the sealing plate of the present invention, the rounded side 62 is received within the guide channels 34 of the axial sealing pads 20. The ridge 64 therefore points outwardly to form a tight seal with the surrounding coupling. When used to form arcuate gasket sections vulcanized to the interior of the coupling 50, the flattened portion 63 is received within and vulcanized to the inner recesses 55 of the coupling 50.

It may be seen from the foregoing description that a sealing plate embodying the present invention differs in significant respects from prior sealing plates and provides significant advantages. The sealing plate 10 is placed under the O-rings so that the circumferential seal is transferred from the O-rings to the circumferential sealing pads 40, while the axial ridges 36 completes the sealing of the axial slit of the coupling. When used with a coupling having O-ring segments bonded to the interior thereof, the sealing plate simplifies installation which consists of placing the sealing plate against the pipe ends across the joint, placing the coupling or the sections of the coupling around the pipe ends with the O-ring segments in the guide channels of the sealing plate, and tightening the coupling. If separate O-rings are used, they are positioned over the sealing plate, holding it in position for installation of the coupling, and they in turn maintain the O-rings in proper position. These advantages greatly facilitate convenient and accurate installation of couplings, particularly in situations where access to the leak location or joint is difficult and where the location is surrounded by water.

While this invention has been described in detail with particular reference to preferred embodiments thereof, it will be understood that variations and modifications can be effected within the spirit and scope of the invention as described hereinbefore and as defined in the appended claims.

I claim:

1. A sealing plate for use with a pipe coupling surrounding a leak location in a pipeline, comprising:
   a plate having a pair of axial edges along opposite ends of said plate and a pair of side edges along opposite sides of said plate;
   a pair of axial sealing pads, one adhered to an outer surface of said plate along each of said axial edges, each axial sealing pad defining a pair of spaced apart circumferential channels therein and a bridging member connecting said channels, said bridging member shaped to be engaged by an inner surface of said pipe coupling when said inner surface is pressed toward the outer surface of said plate; and
   a pair of spaced apart circumferential sealing pads adhered to an inner surface of said plate.

2. The sealing plate of claim 1, wherein said axial sealing pad extends beyond each of said axial edges at the location of said channels and said circumferential sealing pads extend beyond said axial edges and are attached to said axial sealing pads at opposite ends of said circumferential sealing pads.

3. The sealing plate of claim 1, wherein each of said channels is defined by a pair of spaced apart humps positioned adjacent to a side edge of said plate, each of said pair of spaced apart humps comprising an inner hump and an outer hump, said outer hump positioned closer to said respective side edge than said respective inner hump.

4. The sealing plate of claim 3, wherein said bridging member connecting said channels comprises an axial ridge connecting the inner humps of the two pair of humps defining the two channels of each of said axial sealing pads.

5. The sealing plate of claim 4, wherein said axial ridge extends approximately parallel to said axial edges beyond said inner humps into said channels.

6. The sealing plate of claim 5, wherein said axial sealing pads are triangular in cross section, and wherein said humps are positioned on a face of said triangle facing generally toward an axial edge of said plate.

7. The sealing plate of claim 6, wherein said humps are elongate in a circumferential direction.

8. The sealing plate of claim 7, wherein said axial sealing pad extends beyond each of said axial edges at the location of said channels and said circumferential sealing pads extend beyond said axial edges and are attached to said axial sealing pads at opposite ends of said circumferential sealing pads.

9. A pipe joint for sealing a leak location in a pipeline, comprising:
   a sealing plate spanning the axial position of said leak location and comprising:
   a plate member having a pair of axial edges along opposite ends of said plate member and a pair of side edges along opposite sides of said plate member;
   a pair of axial sealing pads, one adhered to an outer surface of said plate member along each of said axial edges, each axial sealing pad defining
   a pair of spaced apart circumferential channels, one on each side of said leak location, said pad extending beyond each of said axial edges at the location of said channels; and
   a bridging member of said pad connecting said channels; and
   a pair of spaced apart circumferential sealing pads adhered to an inner surface of said plate member, said circumferential sealing pads extending beyond said axial edges and being attached to said axial sealing pads at opposite ends of said circumferential sealing pads;
   a pair of arcuate gaskets positioned around said pipeline one on each side of said leak location, each of said arcuate gaskets engaging both of said axial sealing pads in respective channels; and
   an annular coupling having at least one axial joint, said coupling being positioned around said arcuate gaskets with said axial joint positioned over said sealing plate, said coupling being closable to engage an inner surface of said coupling with said gaskets and with said bridging members, and to engage said circumferential sealing pads with said pipeline on either side of said leak location.

10. The pipe joint of claim 9, wherein said arcuate gaskets are attached to said inner surface of said coupling.

11. The pipe joint of claim 10, wherein said gaskets define in cross section a rounded inner side and a flattened outer side.

12. The pipe joint of claim 11, wherein said flattened side of said gaskets includes a ridge intermediate the edges of said flattened side.

13. The pipe joint of claim 9, wherein said arcuate gaskets are annular O-rings.

14. The pipe joint of claim 9, wherein each of said channels is defined by a pair of spaced apart humps positioned adjacent to a side edge of said plate.

15. The pipe joint of claim 14, wherein said bridging member connecting said channels comprises an axial ridge connecting the inner humps of the two pair of humps defining the two channels of each of said axial sealing pads.

16. The pipe joint of claim 15, wherein said axial ridge extends beyond said inner humps into said channels.

17. The pipe joint of claim 16, wherein said arcuate gaskets engage the extensions of said axial ridge in said channels.

18. A method of sealing a leak location in a pipeline, comprising the steps of:
   placing a sealing plate across the axial position of said leak location, said sealing plate comprising:
   a plate member having a pair of axial edges along opposite ends of said plate member and a pair of side edges along opposite sides of said plate member;
   a pair of axial sealing pads, one adhered to an outer surface of said plate member along each of said axial edges, each axial sealing pad defining
   a pair of spaced apart circumferential channels, one on each side of said leak location, said pad extending beyond each of said axial edges at the location of said channels; and
   a bridging member connecting said channels;
   a pair of spaced apart circumferential sealing pads adhered to an inner surface of said plate member, said circumferential sealing pads extending beyond said axial edges and being attached to said axial sealing pads at opposite ends of said circumferential sealing pads;
   positioning a pair of arcuate gaskets around said pipeline one on each side of said leak location, each of said arcuate gaskets engaging said plate member by engaging both of said axial sealing pads in said respective channels; and
   closing a coupling having at least one axial joint around said pair of arcuate gaskets and said sealing plate, said axial joint being positioned over said sealing plate, to engage an inner surface of said coupling with said gaskets and said bridging members, and to engage said circumferential sealing pads with said pipeline on either side of said leak location.

19. The method of claim 18, further comprising the steps of attaching said arcuate gaskets to said inner surface of said coupling.

20. A pipe coupling, comprising:
   a cylindrical member having an inner surface and an outer surface, and including an axial joint defined by a first axial edge and a second axial edge;
   said cylindrical member defining at least one arcuate groove extending outwardly from the inner surface thereof; and
   an arcuate gasket member received by and adhered to said arcuate groove, said gasket member comprising a flattened side including a central ridge engaging said groove, and a rounded side facing away from said groove.

21. A pipe joint for sealing a leak location in a pipeline, comprising:
   an annular coupling having at least one axial joint;
   a sealing plate comprising a plate member having a first axial edge and a second axial edge along opposite ends of said plate member and a pair of side edges along opposite sides of said plate member;

a first axial sealing pad adhered to an outer surface of said plate member along said first axial edge, said first axial sealing pad defining a pair of spaced apart circumferential guide channels, one on each side of said leak location, and a bridging member connecting said guide channels;

a second axial sealing pad adhered to the outer surface of said plate member along said second axial edge; and a pair of spaced apart circumferential sealing pads adhered to an inner surface of said plate member;

a pair of arcuate gaskets attached to an inner surface of said coupling, one on each side of said leak location, each of said arcuate gaskets engaging said second axial sealing pad and one of said circumferential sealing pads, and engaging said first axial sealing pad in one of said guide channels; and means for closing said coupling with said axial joint above said sealing plate, with an inner surface of said coupling engaging said first and second sealing pads and said arcuate gaskets around said pipeline, and with said circumferential sealing pads engaging said pipeline such that a sealing connection is formed between each of said circumferential sealing pads and a corresponding arcuate gasket.

* * * * *